(12) United States Patent
Okayasu

(10) Patent No.: US 8,896,923 B2
(45) Date of Patent: Nov. 25, 2014

(54) CORRUGATED PATTERN FORMING SHEET, AND METHODS FOR MANUFACTURING ANTIREFLECTOR, RETARDATION PLATE, ORIGINAL PROCESS SHEET PLATE, AND OPTICAL ELEMENT

(75) Inventor: Toshiki Okayasu, Kawasaki (JP)

(73) Assignee: OJI Holdings Corporation, Tokyo (JP)

( * ) Notice: Subject to any disclaimer, the term of this patent is extended or adjusted under 35 U.S.C. 154(b) by 0 days.

(21) Appl. No.: 12/768,517

(22) Filed: Apr. 27, 2010

(65) Prior Publication Data

US 2010/0213627 A1 Aug. 26, 2010

Related U.S. Application Data

(62) Division of application No. 11/746,018, filed on May 8, 2007, now Pat. No. 7,736,551.

(30) Foreign Application Priority Data

May 10, 2006 (JP) ............... P2006-131281
Feb. 21, 2007 (JP) ............... P2007-040693
Apr. 12, 2007 (JP) ............... P2007-104714

(51) Int. Cl.
*G02B 1/11* (2006.01)
*B29D 11/00* (2006.01)
*G02B 5/30* (2006.01)

(52) U.S. Cl.
CPC ............ *G02B 1/11* (2013.01); *B29D 11/00788* (2013.01); *B29D 11/00* (2013.01); *G02B 5/3083* (2013.01); *Y10S 359/90* (2013.01)
USPC ............ 359/585; 359/580; 264/1.7; 359/900

(58) Field of Classification Search
CPC .................. B29D 11/00769; B29D 11/00788; B29D 11/00798
USPC ................. 359/580, 581, 584, 585, 566, 569; 428/182

See application file for complete search history.

(56) References Cited

U.S. PATENT DOCUMENTS 3,235,630 A * 2/1966 Doherty et al. ............... 264/1.31
4,013,465 A * 3/1977 Clapham et al. ................ 430/11

(Continued)

FOREIGN PATENT DOCUMENTS

| CN | 1191327 A | 8/1998 |
| CN | 1197929 | 11/1998 |

(Continued)

OTHER PUBLICATIONS

Office Action issued in related Japanese Patent Application No. JP 2007-151795, dated Nov. 2, 2010.

(Continued)

*Primary Examiner* — Zachary Wilkes
(74) *Attorney, Agent, or Firm* — Knobbe Martens Olson & Bear LLP

(57) ABSTRACT

A corrugated pattern forming sheet exhibiting excellent performance when being used as optical elements, such as an antireflector and a retardation plate is provided. A corrugated pattern forming sheet of the invention includes a resin layer, and a hard layer provided at least in a portion of an outer surface of the resin layer. The hard layer is made of a metal or a metallic compound. The hard layer has a wavelike corrugated pattern. The average pitch of the corrugated pattern is 1 μm or less, and the average depth of the bottom of the corrugated pattern is 10% or more given an average pitch of 100%.

13 Claims, 3 Drawing Sheets

(56) References Cited

U.S. PATENT DOCUMENTS

| | | | |
|---|---|---|---|
| 4,856,857 A * | 8/1989 | Takeuchi et al. | 359/3 |
| 5,914,825 A | 6/1999 | Nishio et al. | |
| 7,102,823 B2 * | 9/2006 | Schilling et al. | 359/566 |
| 7,345,819 B2 | 3/2008 | Baba et al. | |
| 7,445,733 B2 | 11/2008 | Arakawa et al. | |
| 2002/0191286 A1 * | 12/2002 | Gale et al. | 359/486 |
| 2004/0105057 A1 | 6/2004 | Tanada et al. | |
| 2004/0184151 A1 * | 9/2004 | Schilling et al. | 359/529 |
| 2004/0223220 A1 | 11/2004 | Kawanishi et al. | |
| 2008/0129931 A1 * | 6/2008 | Takahashi et al. | 349/96 |

FOREIGN PATENT DOCUMENTS

| | | |
|---|---|---|
| CN | 1461286 A | 12/2003 |
| CN | 1468383 A | 1/2004 |
| CN | 1575064 A | 2/2005 |
| CN | 1657584 A | 8/2005 |
| CN | 1725104 A | 1/2006 |
| EP | 0265007 A1 | 4/1988 |
| JP | 53-113874 | 10/1978 |
| JP | 57-010102 A | 1/1982 |
| JP | 58-193765 | 11/1983 |
| JP | 59-107230 | 7/1984 |
| JP | A-62-102445 | 5/1987 |
| JP | 62231753 A | 10/1987 |
| JP | A-62-225273 | 10/1987 |
| JP | A-63-49702 | 3/1988 |
| JP | 63104001 A | 5/1988 |
| JP | 63-301988 | 12/1988 |
| JP | 03-142401 | 6/1991 |
| JP | 03-142401 A | 6/1991 |
| JP | A-62-102445 | 6/1991 |
| JP | 05507658 A | 11/1993 |
| JP | 6-143474 A | 5/1994 |
| JP | 6-322629 A | 11/1994 |
| JP | 09-304617 | 11/1997 |
| JP | 10-123307 | 5/1998 |
| JP | A-10-142410 | 5/1998 |
| JP | 2000-094536 A | 4/2000 |
| JP | 2000-193807 | 7/2000 |
| JP | A-2000-193805 | 7/2000 |
| JP | 2000-264000 | 9/2000 |
| JP | 2000-267551 | 9/2000 |
| JP | 2000/280267 A | 10/2000 |
| JP | 2002-182003 | 6/2002 |
| JP | 2002-253459 A | 9/2002 |
| JP | 2002-267815 | 9/2002 |
| JP | 2002-286906 | 10/2002 |
| JP | 2002-333502 | 11/2002 |
| JP | 2002-333508 | 11/2002 |
| JP | 2003-187503 | 7/2003 |
| JP | 2003-215314 | 7/2003 |
| JP | 2003-215574 | 7/2003 |
| JP | 2003/266570 A | 9/2003 |
| JP | 2004-026305 A | 1/2004 |
| JP | 2004-37982 | 2/2004 |
| JP | 2004-077806 | 3/2004 |
| JP | 2004-157430 A | 6/2004 |
| JP | 2004-258308 | 9/2004 |
| JP | A-2004-319251 | 11/2004 |
| JP | 2005-138296 | 6/2005 |
| JP | 2005-153091 | 6/2005 |
| JP | 2005-205683 A | 8/2005 |
| JP | 2005-279807 | 10/2005 |
| JP | 2005-321611 | 11/2005 |
| JP | 2005-321681 A | 11/2005 |
| JP | 2006-3647 | 1/2006 |
| JP | 2006-227267 A | 8/2006 |
| JP | 2006-337575 | 12/2006 |
| JP | T-2008-512834 | 4/2008 |
| KR | 10-2002-0088395 A | 11/2002 |
| KR | 10-2006-0116016 | 11/2006 |
| WO | 91/15355 A1 | 10/1991 |
| WO | WO 99/39890 A1 | 8/1999 |
| WO | WO2006/013969 | 2/2006 |
| WO | WO 2006/027304 | 3/2006 |

OTHER PUBLICATIONS

Office Action issued in counterpart Chinese Patent Application No. 200710101761.6, dated May 28, 2010.

Office Action issued in Japanese Patent Application No. 2007-151677 on Jan. 4, 2012.

Office Action issued on Jul. 20, 2011 in corresponding Chinese Patent Application No. 200780051495.9.

Genzer et al., "Soft matter with hard skin: From skin wrinkles to templating and material characterization", The Royal Society of Chemistry 2006, vol. 2, pp. 310-323, Feb. 8, 2006.

Miyakoshi et al., "Polymeric Wide-band Wave Plate Produced via Nanoimprint Subwavelength Grating", Konica Minolta Technology Report, vol. 2, pp. 97-100, 2005.

Hirasawa et al., "Photo-curable Resins and the Evaluation Methods for UV-Nanoimprint Lithography", IEEJ Trans. EIS, vol. 127, No. 2, pp. 174-178, 2007.

Partial translation of Office Action (Notification-Information Statement) issued on Oct. 11, 2011, in Japanese Patent Application No. 2007-117406.

Partial translation of Office Action (Notification-Information Statement) issued on Oct. 18, 2011, in Japanese Patent Application No. 2007-040694.

Translation of Office Action issued on Oct. 25, 2011, in Japanese Patent Application No. 2007-117406.

Office Action issued in Chinese Patent Application No. 200710101761.6 on Feb. 21, 2012.

Office Action mailed on May 22, 2012 in Japanese Application No. 2007-040694.

Chinese Office Action re Application No. 201110027745.3 issued on Sep. 28, 2012.

Notice of Allowance dated Dec. 21, 2012 in corresponding Japan Patent Application No. 2011-281958.

Office Action dated Dec. 31, 2012 in corresponding China Patent Application No. 200710101761.6.

Notice of Allowance mailed Jan. 29, 2013 in related Japanese patent application No. 2007-040694.

Office Action mailed Jan. 29, 2013 in related Japanese patent application No. 2007-151676.

Office Action issued in counterpart Chinese Patent Application No. 200710101761.6, dated Nov. 20, 2009.

Hisao Kikuchi, et al., Optics, Optical Society of Japan, vol. 27, No. 1, 1998, pp. 12-17 and partial English translation thereof (p. 12, col. 1, lines 1 to 18 and p. 14 col. 1, line 20 to col. 2, line 17).

Ned Bowden, et al. Nature, No. 393, 1998, p. 146.

Office Action Issued Nov. 28, 2013 in corresponding Korean Application No. 10-2012-7017847.

Office Action issued Mar. 3, 2014 in corresponding Chinese Patent Application No. 201210109843.6.

Notice of Allowance issued Mar. 11, 2014 in corresponding Japanese Patent Application No. 2013-076384.

Office Action issued Mar. 25, 2014 in corresponding Korean Patent Application No. 10-2014-7002311.

Office Action received in connection to the corresponding Japanese Patent Application No. 2013/171757 mailed May 27, 2014.

Office Action received in connection to the corresponding Japanese Patent Application No. 2013-171758 mailed May 27, 2014.

* cited by examiner

DISTANCE FROM THE CENTER OF CIRCULAR RING

CORRUGATED PATTERN FORMING SHEET, AND METHODS FOR MANUFACTURING ANTIREFLECTOR, RETARDATION PLATE, ORIGINAL PROCESS SHEET PLATE, AND OPTICAL ELEMENT

RELATED APPLICATIONS

This application is a divisional of U.S. application Ser. No. 11/746,018, filed May 8, 2007, which claims priority to Japanese Patent Application No. 2006-131281, filed May 10, 2006; Japanese Patent Application No. 2007-040693, filed Feb. 21, 2007; and Japanese Patent Application No. 2007-104714, filed Apr. 12, 2007, the entire contents of which are incorporated herein by reference.

TECHNICAL FIELD

The present invention relates to a corrugated pattern forming sheet provided in optical elements, such as an antireflector and a retardation plate, and a method for manufacturing the same. The present invention also relates to an antireflector and a retardation plate in which the corrugated pattern forming sheet is used. The present invention also relates to an original process sheet plate, which is used as a die for manufacturing a sheet having a corrugated pattern. Moreover, the present invention relates to a method for manufacturing an optical element.

BACKGROUND OF THE INVENTION

It is known (refer to "Optics" (Volume 27, No. 1, 1998, Pages 12-17) written by Hisao Kikuta and Koichi Iwata and issued by the Optical Society of Japan) that a corrugated pattern forming sheet in which a corrugated pattern composed of minute wavelike irregularities is formed on a surface and the average pitch of the corrugated pattern is below the wavelength of visible light can be utilized as optical elements, such as an antireflector and a retardation plate.

Here, the average pitch is an average value of the pitch that is the distance between an apex of a convex portion of the corrugated pattern and an apex of a convex portion adjacent to the convex portion in a case where the corrugated pattern runs only in one direction. On the other hand, the average pitch is obtained as follows in a case where the corrugated pattern does not run in a specific direction. First, the top surface of a corrugated pattern is captured by an atomic force microscope, and the image is converted into a gray-scale file (for example, tiff format, etc.).

In an image (refer to FIG. 4) of the gray-scale file, a lower whiteness means that a bottom of a concave portion is deeper (a higher whiteness means that an apex of a convex portion is higher). Next, the image of the gray-scale file is Fourier-transformed. The image after the Fourier transformation is shown in FIG. 5. In the image after the Fourier transformation, the direction as seen from the center of a white portion represents the directivity of the gray-scales, and the inverse number of the distance from the center to the white portion represents the period of the gray-scale image. In a case where the corrugated pattern does not run in a specific direction, an image showing a white circular ring like FIG. 6 is obtained. Next, the luminance (Y-axis) with respect to the distance (X-axis) from the center of the circular ring is plotted by drawing a linear auxiliary line L2 from the center of the circular ring in the image after the Fourier transformation towards the outside (refer to FIG. 4). Then, a value r on the X-axis showing a maximal value in the plot is read. The inverse number (1/r) of this value r is an average pitch.

The corrugated pattern forming sheet can be utilized as an antireflector on the basis of the following reasons.

In a case where the corrugated pattern is not provided in a sheet surface, reflection is caused by an abrupt change in refractive index in an interface between the sheet and air. However, in a case where a wavelike corrugated pattern is provided in a sheet surface, i.e., an interface between the sheet and air, a value (hereinafter referred to as "middle refractive index") between the refractive index of air and the refractive index of a corrugated pattern forming sheet is shown in a portion of the corrugated pattern, and moreover, the middle refractive index continuously changes in the depth direction of the corrugated pattern. Specifically, the refractive index of a deeper position approaches the refractive index of the corrugated pattern forming sheet. Because the middle refractive index continuously changes in this way, reflection of light can be suppressed without causing an abrupt change in refractive index in the interface as described above. Further, if the pitch of a corrugated pattern is below the wavelength of visible light, coloring by diffraction of visible light, i.e., interference of visible light, in a portion of the corrugated pattern is hardly caused.

Further, the corrugated pattern forming sheet can be utilized as a retardation plate because a portion of the corrugated pattern shows optical anisotropy against the light that is incident on the corrugated pattern with the result that air and a corrugated pattern forming sheet whose refractive indexes are different from each other are arranged alternately. Moreover, if the pitch of a corrugated pattern becomes approximately equal to or less than the wavelength of visible light, a phenomenon in that the same retardation is shown in a broad visible light wavelength range will appear.

As a specific example of such a corrugated pattern forming sheet, for example, a sheet in which gold is vapor-deposited on one surface of a sheet made of heated polydimethyl siloxane to form a metal layer, and then cooled, whereby the sheet made of polydimethyl siloxane is made to shrink, thereby forming a wavelike corrugated pattern in the surface of the metal layer, is suggested in "Nature" (No. 393, 1998, Page 146) written by Ned Bowden.

Further, a sheet in which a foundation layer and a metal layer are sequentially formed in the surface of a heat-shrinkable synthetic resin film, and then the heat-shrinkable synthetic resin film is made to thermally shrink to form a wavelike corrugated pattern in the surface of the metal layer is suggested in JP-A-Sho63-301988.

A sheet in which a layer made of a material that is reduced in volume by exposure is formed, and the layer is exposed to form irregularities in a surface thereof is suggested in JP-A-2003-187503.

However, none of the corrugated pattern forming sheets described in JP-A-Sho63-301988, JP-A-2003-187503, and "Nature" written by Ned Bowden show excellent performance as optical elements. Specifically, when the corrugated pattern forming sheets are used as antireflectors, the reflectance cannot be made low enough, and when the corrugated pattern forming sheets are used as retardation plates, the retardation cannot be made large enough, and the same retardation cannot be caused over a broad wavelength range.

Further, photolithography by the visible light that uses a pattern mask is known as a method for manufacturing a corrugated pattern forming sheet. However, a corrugated pattern forming sheet with a pitch below the wavelength of the light that can be utilized as an optical element cannot be manufactured by this method. Therefore, it is necessary to apply an ultraviolet laser interference method or electron beam lithography that allows finer processing. In these methods, a resist layer formed on a substrate is exposed and developed with ultraviolet laser interference light or electron beams to form a resist pattern layer, and irregularities are formed by a dry etching method, etc. by using the resist pattern layer as a mask. However, when the ultraviolet laser interferometer method or electron beam lithography is applied, there is a problem in that this method is not suitable for mass production because processing in a broad region which exceeds 10 cm is difficult.

A method for arranging a particle layer on a substrate and dry-etching the surface of the substrate by using the particle layer as an etching mask is also suggested in JP-A-2005-279807. However, there is a problem in that this method is also not suitable for mass production because processing in a broad region which exceeds 30 cm is difficult.

SUMMARY OF THE INVENTION

The invention has been made in view of the above situations. Therefore, an object of the invention is to provide a corrugated pattern forming sheet exhibiting excellent performance when being used as optical elements, such as an antireflector and a retardation plate. Another object of the invention is to provide a method for manufacturing a corrugated pattern forming sheet capable of simply and easily manufacturing such a corrugated pattern forming sheet with large area. Still another object of the invention is to provide an antireflector with a low reflectance, and a retardation plate which causes the same retardation over a broad wavelength range. A still further object of the invention is to provide an original process sheet plate capable of simply and easily manufacturing a suitable sheet forming a corrugated pattern as an optical element on a large scale. A still further object of the invention is to provide a method for manufacturing an optical element capable of simply and easily manufacturing an optical element having a corrugated pattern of a suitable average pitch and average depth for an optical element on a large scale.

The present inventors have invented the following corrugated pattern forming sheet, as a result of studying improvements in the performance of optical elements, such as an antireflector and a retardation plate. The present inventors have also invented the following method for manufacturing a corrugated pattern by studying a method for manufacturing such a corrugated pattern forming sheet. Also, the present inventors have invented a method for manufacturing the following antireflector, retardation plate, original process sheet plate, and optical element.

(1) A corrugated pattern forming sheet comprising a resin layer, and a hard layer provided at least in a portion of an outer surface of the resin layer, the hard layer having a wavelike corrugated pattern, wherein the hard layer is made of a metal or a metallic compound, and the average pitch of the corrugated pattern is 1 µm or less, and the average depth of the bottom of the corrugated pattern is 10% or more given an average pitch of 100%.
(2) The corrugated pattern forming sheet according to (1), wherein the hard layer is made of a metallic compound.
(3) The corrugated pattern forming sheet according to (2), wherein the metallic compound is at least one kind of metallic compound selected from the group consisting of titanium oxide, aluminum oxide, zinc oxide, magnesium oxide, tin oxide, copper oxide, indium oxide, cadmium oxide, lead oxide, silicon oxide, barium fluoride, calcium fluoride, magnesium fluoride, zinc sulfide, and gallium arsenide.
(4) The corrugated pattern forming sheet according to (1), wherein the hard layer is made of a metal.
(5) The corrugated pattern forming sheet according to (4), wherein the metal is at least one kind of metal selected from the group consisting of gold, aluminum, silver, carbon, copper, germanium, indium, magnesium, niobium, palladium, lead, platinum, silicon, tin, titanium, vanadium, zinc, and bismuth.
(6) A method for manufacturing a corrugated pattern forming sheet comprising: providing a hard layer having a smooth surface at least in a portion of an outer surface of a resin layer to form a laminated sheet; and meanderingly deforming at least the hard layer of the laminated sheet, wherein the hard layer is made of a metal or a metallic compound.
(7) An antireflector comprising the corrugated pattern forming sheet of any one of (1) to (5).
(8) A retardation plate comprising the corrugated pattern forming sheet of any one of (1) to (5).
(9) An original process sheet plate, comprising the corrugated pattern forming sheet of any one of (1) to (5), and used as a die for manufacturing a sheet having a corrugated pattern with a same average pitch and average depth as the corrugated pattern forming sheet.
(10) A method for manufacturing an optical element comprising: a step in which an uncured curable resin is coated on a surface of the original process sheet plate of (9), in which the corrugated pattern is formed; and a step in which a cured coating film is peeled from the original process sheet plate after curing the curable resin.
(11) A method for manufacturing an optical element comprising: a step in which a sheet-like thermoplastic resin is contacted with a surface of the original process sheet plate of (9), in which the corrugated pattern is formed; a step in which the thermoplastic resin is cooled after softening by heating while pressing to the original process sheet plate; and a step in which the cooled sheet-like thermoplastic resin is peeled from the original process sheet plate.
(12) A method for manufacturing an optical element comprising: a step in which a material for transferring a corrugated pattern is laminated on a surface of the original process sheet plate of (9), in which the corrugated pattern is formed; a step in which a secondary process sheet is prepared by peeling the material for transferring the corrugated pattern laminated on the corrugated pattern from the original process sheet plate; a step in which an uncured curable resin is coated on a surface of the secondary process sheet which has contacted to the corrugated pattern of the original process sheet plate; and a step in which a cured coating film is peeled from the secondary process sheet after curing the curable resin.
(13) A method for manufacturing an optical element comprising: a step in which a material for transferring a corrugated pattern is laminated on a surface of the original process sheet plate of (9), in which the corrugated pattern is formed; a step in which a secondary process sheet is prepared by peeling the material for transferring the corrugated pattern laminated on the corrugated pattern from the original process sheet plate; a step in which a sheet-like thermoplastic resin is contacted with a surface of the secondary process sheet which has contacted to the corrugated pattern of the original process sheet plate; a step in which the thermoplastic resin is cooled after softening by heating while pressing to the secondary process sheet; and a step in which the cooled sheet-like thermoplastic resin is peeled from the secondary process sheet.

The corrugated pattern forming sheet of the invention can be suitably utilized as optical elements, such as an antireflector and a retardation plate. The corrugated pattern forming sheet of the invention can also be suitably utilized as an original process sheet plate to be used as a die for manufacturing an optical element having a wavelike corrugated pattern.

Since a fine corrugated pattern can be easily formed in a surface with a large area by the method for manufacturing a corrugated pattern forming sheet of the invention, the corrugated pattern forming sheet which can be suitably utilized for optical elements, etc. can be easily and simply manufactured with large area on a large scale.

The antireflector of the invention has a low reflectance, and has excellent performance.

The retardation plate of the invention can cause the same retardation over a broad wavelength range, and has excellent performance.

By using the original process sheet plate of the present invention, a sheet forming a corrugated pattern of a suitable average pitch and average depth for an optical element can be simply and easily manufactured on a large scale.

According to a method for manufacturing an optical element of the present invention, an optical element having a corrugated pattern of a suitable average pitch and average depth for an optical element can be simply and easily manufactured on a large scale.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

(Corrugated Pattern Forming Sheet)

One embodiment of a corrugated pattern forming sheet of the invention will be described.

Figure 1:
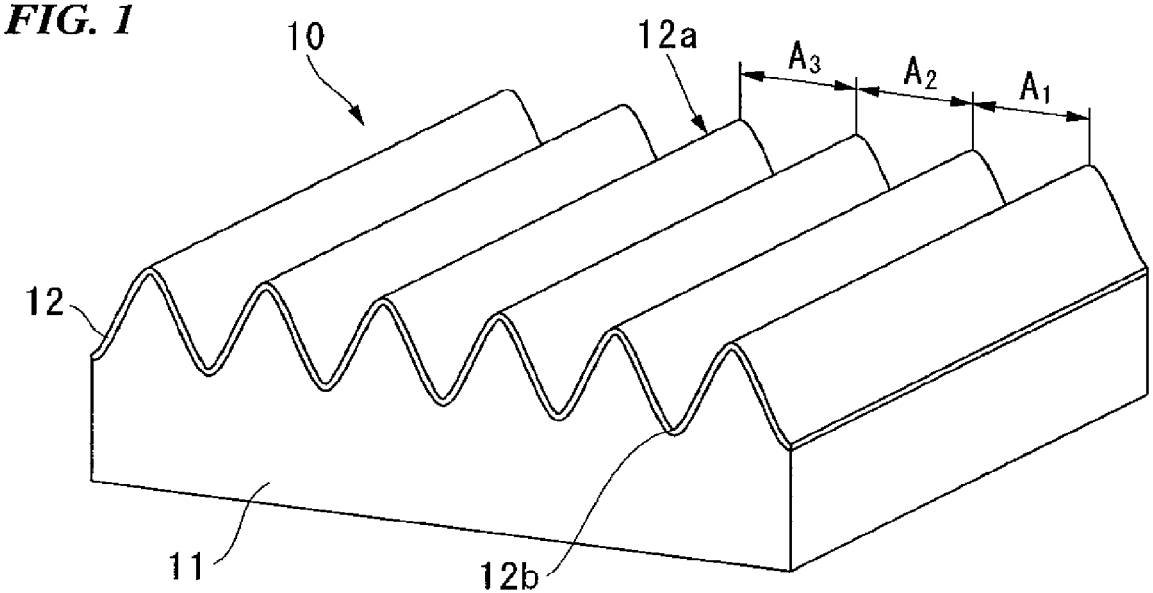
FIG. 1 is an enlarged perspective view showing an enlarged portion of one embodiment of a corrugated pattern forming sheet of the invention.

A corrugated pattern forming sheet of the present embodiment is shown in FIG. 1. The corrugated pattern forming sheet 10 of the present embodiment includes a resin layer 11, and a hard layer 12 provided in one whole surface of the resin layer 11, and the hard layer 12 has a periodic wavelike corrugated pattern 12a along the width direction of the corrugated pattern forming sheet 10.

The resin layer 11 is made of, for example, polyesters, such as polyethylene terephthalate; polyolefins, such as polyethylene and polypropylene; polystyrene-based resins, such as styrene butadiene block copolymers; silicone resins, such as polydimethyl siloxane; and resins, such as polyvinyl chloride, polyvinylidene chloride, fluororesin, ABS resin, polyamide, acrylic resin, polycarbonate, and polycycloolefin.

The thickness of the resin layer 11 is preferably 0.3 to 500 μm. If the thickness of the resin layer 11 is 0.3 m or more, the corrugated pattern forming sheet 10 is hardly broken, and if the thickness of the resin layer is 500 μm or less, the corrugated pattern forming sheet 10 can be made thin easily. Further, in order to support the resin layer 11, a base member made of resin having a thickness 5 to 500 μm may be provided.

The hard layer 12 is made of a metal or metallic compound.

As the metal, at least one kind of metal selected from the group consisting of gold, aluminum, silver, carbon, copper, germanium, indium, magnesium, niobium, palladium, lead, platinum, silicon, tin, titanium, vanadium, zinc, and bismuth is preferable because a Young's modulus does not become too high and the corrugated pattern 12a is formed more easily. The term "metal" also includes semi-metals of carbon, germanium, tin, etc.

As the metallic compound, at least one kind of metallic compound selected from the group consisting of titanium oxide, aluminum oxide, zinc oxide, magnesium oxide, tin oxide, copper oxide, indium oxide, cadmium oxide, lead oxide, silicon oxide, barium fluoride, calcium fluoride, magnesium fluoride, zinc sulfide, and gallium arsenide is preferable for similar reasons. Among them, titanium oxide is preferable because it is a photocatalyst which decomposes an organic matter adhering to a surface when it is irradiated with light, and has a self-cleaning function.

In addition, in a case where the hard layer 12 is made of metal, the surface of the layer may be air-oxidized, thereby forming an air oxidization film. However, in the invention, the surface of such a metal layer which is air-oxidized is also considered as a layer made of metal.

The thickness of the hard layer 12 is preferably 1 to 30 nm. If the thickness of the hard layer 12 is 1 nm or more, defects are hardly developed in the hard layer 12, and if the thickness is 30 nm or less, the hard layer 12 can secure optical transparency sufficiently.

Further, the thickness of the hard layer 12 is more preferably 10 nm or less, and particularly preferably 5 nm or less. If the thickness of the hard layer 12 is 10 nm or less, a corrugated pattern forming sheet can be easily manufactured as described later.

Further a primer layer may be formed between the resin layer 11 and the hard layer 12 for the purpose of an improvement in adhesiveness, and formation of a finer structure.

Moreover, a resin layer may be provided on the hard layer 12.

The average pitch A of the corrugated pattern 12a of the corrugated pattern forming sheet 10 is 1 μm or less, preferably 0.7 μm or less, and more preferably 0.4 μm or less. Further, the average pitch A is preferably 0.05 μm or more in that the corrugated pattern 12a can be easily formed.

Here, the average pitch A is an average value of individual pitch $A_1, A_2, A_3, \ldots$.

Further, in a case where a corrugated pattern spreads not in one direction but in two dimensions, the average pitch is obtained by a method for Fourier-transforming an image of the corrugated pattern. Specifically, the average pitch is obtained as follows.

Figure 4:
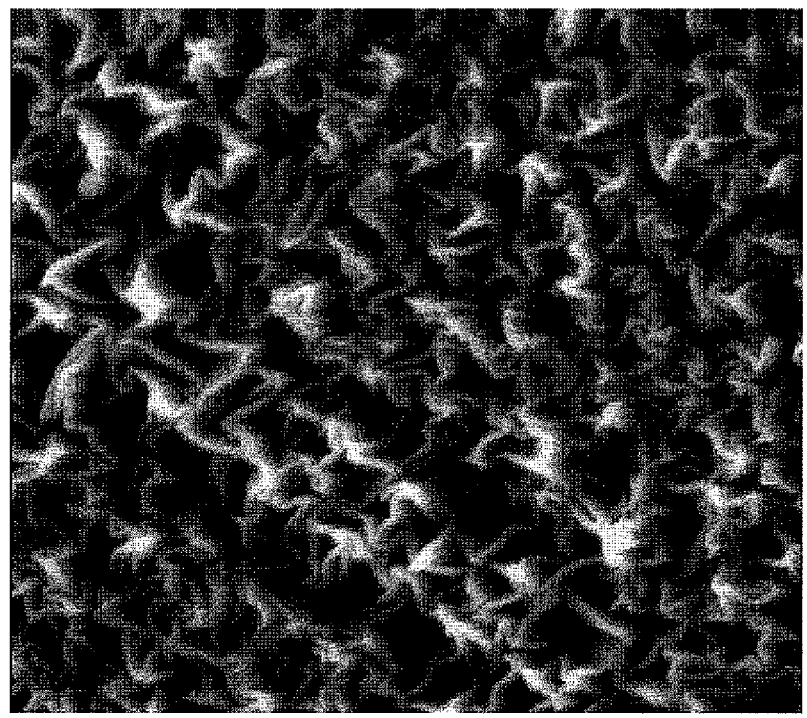
FIG. 4 shows a gray-scale conversion image of the image obtained by capturing the surface of a corrugated pattern which does not run in a specific direction by an atomic force microscope.
Figure 5:
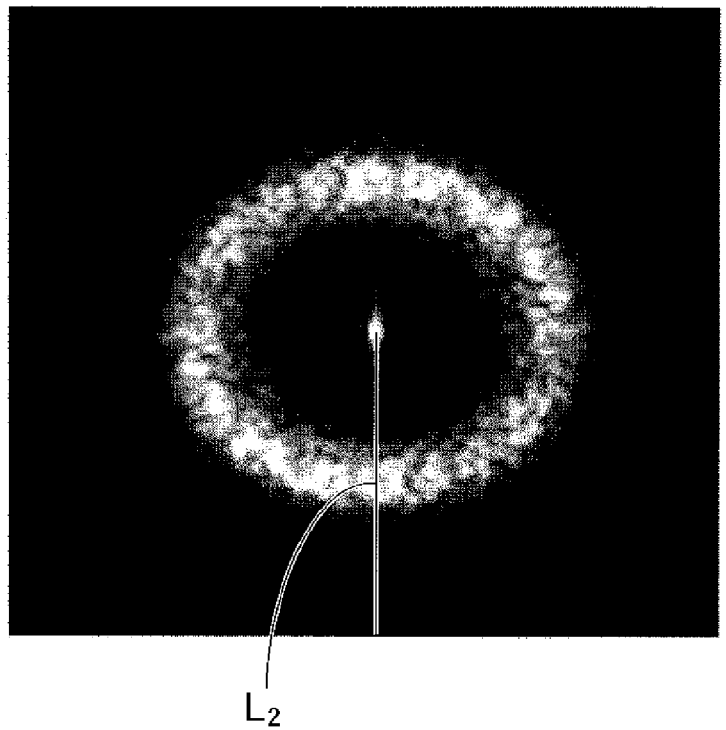
FIG. 5 shows an image obtained by Fourier-transforming the image of FIG. 4.
Figure 6:
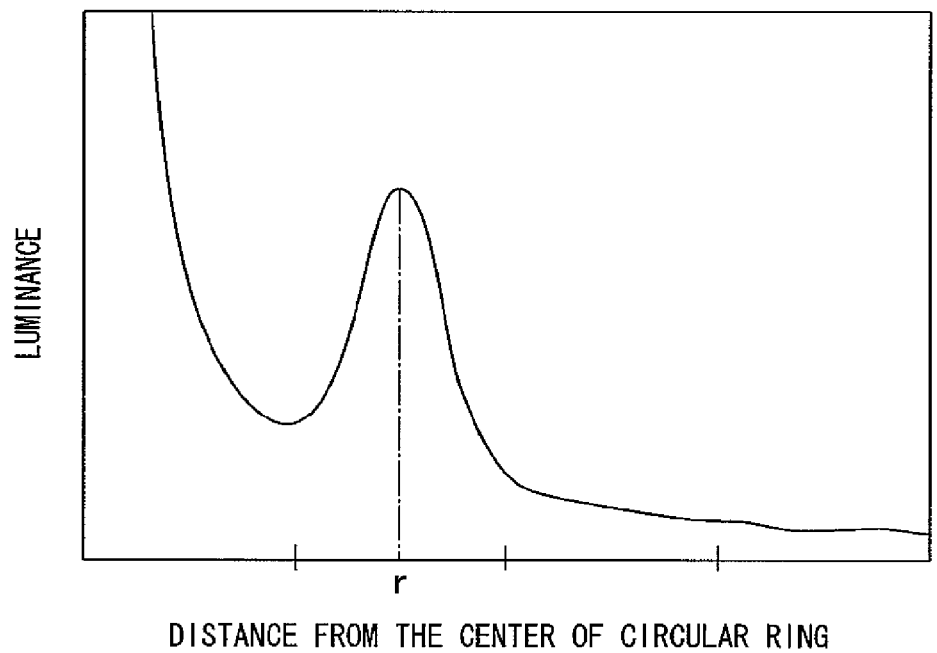
FIG. 6 is a graph obtained by plotting the luminance to the distance from the center of a circular ring in the image of FIG. 5.

First, an image of a top surface of a corrugated pattern captured by an atomic force microscope is converted into a gray-scale file, and the image (refer to FIG. 4) of the file is Fourier-transformed, thereby obtaining a white annular image (refer to FIG. 5). Next, the luminance (Y-axis) with respect to the distance (X-axis) from the center of the circular ring seen in the image after the Fourier transformation is plotted (refer to FIG. 6).

Then, a value r on the X-axis showing a maximal value in the plot is read, and an inverse number (1/r) of this r is adopted as the average pitch.

The average depth B of the bottom $12b$ of the corrugated pattern $12a$ is 10% or more, preferably 30% or more, and more preferably 100% or more, when the average pitch A is 100%. Further, the average depth B is preferably 500% or less when the average pitch A is 100% in that the corrugated pattern $12a$ can be easily formed.

Figure 2:
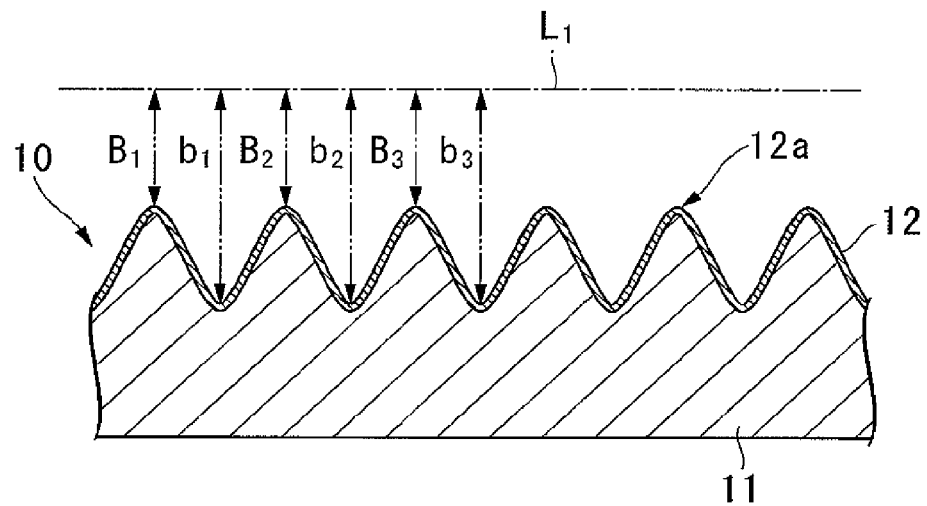
FIG. 2 is a sectional view of the corrugated pattern forming sheet of FIG. 1 when being cut in a direction orthogonal to a direction in which a corrugated pattern is formed.

Here, the bottom $12b$ is an inflection point of a concave portion of the corrugated pattern $12a$. The average depth B is a difference $(b_{AV} - B_{AV})$ between an average value $(B_{AV})$ of lengths $B_1, B_2, B_3, \ldots$ from a reference line L1 parallel to the direction of a surface of the whole corrugated pattern forming sheet 10 to the apex of each convex portion and an average value $(b_{AV})$ of lengths $b_1, b_2, b_3, \ldots$ from the reference line L1 to the bottom of each concave portion, when a cross section (refer to FIG. 2) obtained by cutting the corrugated pattern forming sheet 10 along its longitudinal direction is seen.

The apex of the convex portion and the bottom of the concave portion touch the surface of the hard layer 12 opposite to the resin layer 11.

It was proven as a result of the present inventor's investigation that the corrugated pattern forming sheet exhibits excellent performance as an optical element if the average pitch A of the corrugated pattern $12a$ is 1 μm or less, and particularly 0.4 μm or less, and the average depth B of the bottom $12b$ of the corrugated pattern $12a$ is 10% or more, and particularly 100% or more when the average pitch A is 100%. Specifically, it was proven that the reflectance can be lowered when the corrugated pattern forming sheet 10 is used as the antireflector, and the same retardation can be caused over a broad wavelength range when the corrugated pattern forming sheet is used as a retardation plate.

This is caused by the fact that the average pitch A of the corrugated pattern $12a$ is as short as 1 μm, and the average depth B is as large as 10% when the average pitch A is 100%. That is, the average pitch A is short, and becomes equal to or less than the wavelength of visible light. As a result, diffraction or diffusion of the visible light due to corrugatedness is hardly caused. In addition, since the average depth B is large, a portion where a middle refractive index changes continuously becomes long in the thickness direction. Therefore, the effect of suppressing reflection of light can be exhibited markedly. Further, since the average pitch A is short and the average depth B is large, a portion where air and the corrugated pattern forming sheet whose refractive indexes are different from each other are alternately arranged becomes long in the thickness direction. As a result, since a portion showing optical anisotropy becomes long, a retardation can be caused. Moreover, retardations caused by such a corrugated pattern $12a$ become approximately equal to each other over a broad wavelength range.

All the pitches $A_1, A_2, A_3, \ldots$ of the corrugated pattern $12a$ are preferably within a range of ±60% of the average pitch A, and more preferably within a range of ±30% of the average pitch A. If each of the pitches is within a range of ±60% of the average pitch A, the pitches become uniform. As a result, the corrugated pattern forming sheet exhibits further excellent performance as an optical element.

Further, the pitches may change continuously such that each of the pitches $A_1, A_2, A_3,$ satisfies that the average pitch A is 1 μm or less.

All the depths $B_1, B_2, B_3, \ldots$ of the corrugated pattern $12a$ are preferably within a range of ±60% of the average depth B, and more preferably within a range of ±30% of the average depth B. If each of the depths is within a range of ±60% of the average depth B, the depths become uniform. As a result, the corrugated pattern forming sheet exhibits further excellent performance as an optical element.

Further, the depths may change continuously such that each of the depths $B_1, B_2, B_3, \ldots$ satisfies that the average depth B is 10% or more when the average pitch A is 100%.

As well as the corrugated pattern forming sheet 10 of the invention, as described later, being applied to optical elements, such as an antireflector and a retardation plate, and a process sheet for manufacturing an optical element, it can also be utilized as a superhydrophobic or superhydrophillic sheet.

In addition, the corrugated pattern forming sheet of the invention is not limited to the above-described embodiment. For example, in the above-described embodiment, the hard layer has a wavelike corrugated pattern which is periodic along the width direction of a corrugated pattern forming sheet. However, the hard layer may have a wavelike corrugated pattern which is periodic along the longitudinal direction of a corrugated pattern forming sheet other than the corrugated pattern. Furthermore, a hard layer may have a number of wavelike corrugated patterns which do not run in a specific direction. Even in this case, the corrugated pattern forming sheet exhibits excellent performance as an optical element if the average pitch of a corrugated pattern is 1 μm or less, and the average depth of the bottom of the corrugated pattern is 10% or more given an average pitch of 100%.

Although the convex portion preferably has a sharpened tip in terms of refractive index, the convex portion may have a rounded tip. In a case where a hard layer has a wavelike corrugated pattern which does not run in a specific direction, as a method for measuring the average depth, a method for measuring the depth of each bottom using a cross-sectional image of a corrugated pattern captured by an atomic force microscope and calculating the average value of the depths of the bottoms is adopted.

(Method for Manufacturing Corrugated Pattern Forming Sheet)

One embodiment of a method for manufacturing the corrugated pattern forming sheet of the invention will be described.

Figure 3:
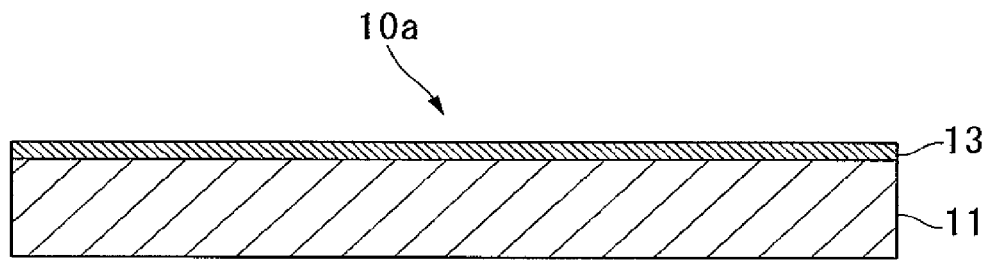
FIG. 3 is a sectional view showing a laminated sheet in one embodiment of a method for manufacturing the corrugated pattern forming sheet of the invention.

The method for manufacturing a corrugated pattern forming sheet of the embodiment, as shown in FIG. 3, is a method having a process for providing a hard layer 13 having a smooth surface (hereinafter referred to as "smooth surface hard layer 13") in one whole surface of a resin layer 11 to form a laminated sheet $10a$ and a process of meanderingly deforming at least the smooth surface hard layer 13 of the laminated sheet $10a$. Here, the smooth surface hard layer 13 is a layer having a centerline average roughness of 0.1 μm or less described in JIS B0601.

In this method, the smooth surface hard layer 13 is made of a metal or metallic compound. By making the smooth surface hard layer 13 of a metal or metallic compound, the smooth surface hard layer 13 is bent like a wave and meanderingly deformed while the resin layer 11 is deformed at the time of compression, and thus the corrugated pattern 12a can be formed easily.

As this manufacturing method, for example, the following methods (1) to (5) can be used.

(1) A method for providing a smooth surface hard layer 13 in one whole surface of a resin layer 11 to form a laminated sheet 10a, and compressing the whole laminated sheet 10a in one direction along the surface thereof.

(2) A method for providing a smooth surface hard layer 13 in one whole surface of a resin layer 11 made of a shrink film that thermally shrinks uniaxially or biaxially to form a laminated sheet 10a, and making the resin layer 11 thermally shrink to compress the smooth surface hard layer 13 laminated on the resin layer 11 in one direction or two or more directions along the surface thereof.

(3) A method for providing a smooth surface hard layer 13 in one whole surface of a resin layer 11 to form a laminated sheet 10a, stretching the laminated sheet 10a in one direction, and making the laminated sheet 10a shrink in a direction orthogonal to the stretching direction to compress the smooth surface hard layer 13 in one direction along the surface thereof.

(4) A method for laminating a smooth surface hard layer 13 on a resin layer 11 formed from an uncured ionizing radiation-curable resin to form a laminated sheet 10a, and irradiating the resin layer 11 with ionizing radiation to cure and shrink the resin layer, thereby compressing the smooth surface hard layer 13 laminated on the resin layer 11 in one direction along the surface thereof.

(5) A method for laminating a smooth surface hard layer 13 on a resin layer 11 that is swelled and expanded with a solvent to form a laminated sheet 10a, and drying and removing the solvent in the resin layer 11 to shrink the resin layer 11, thereby compressing the smooth surface hard layer 13 laminated on the resin layer 11 in one direction along the surface thereof.

The method for laminating a laminated sheet 10a in the method (1) may include, for example, a method for vapor-depositing a metal or metallic compound on one surface of a resin layer 11, a method for laminating a previously prepared smooth surface hard layer 13 on one surface of a resin layer 11, etc.

Since the corrugated pattern 12a can be more easily formed by this manufacturing method, the Young's modulus of the smooth surface hard layer 13 is preferably set to 0.1 to 500 GPa, and more preferably set to 1 to 150 GPa.

In order to make the Young's modulus of the smooth surface hard layer 13 fall within the above range, the smooth surface hard layer 13 is preferably made of at least one kind of metal selected from the group consisting of gold, aluminum, silver, carbon, copper, germanium, indium, magnesium, niobium, palladium, lead, platinum, silicon, tin, titanium, vanadium, zinc, and bismuth. Otherwise, the smooth surface hard layer 13 is preferably made of at least one kind of metallic compound selected from the group consisting of titanium oxide, aluminum oxide, zinc oxide, magnesium oxide, tin oxide, copper oxide, indium oxide, cadmium oxide, lead oxide, silicon oxide, barium fluoride, calcium fluoride, magnesium fluoride, zinc sulfide, and gallium arsenide.

Here, the Young's modulus is a value measured by changing temperature to 23° C. by the "Method for testing the Young's modulus of a metallic material at an elevated temperature" of JIS Z 2280-1993.

This is the same even in a case where the hard layer is made of a metallic compound.

The thickness of the smooth surface hard layer 13 is preferably 10 nm or less, more preferably 7 nm or less, and especially preferably 5 nm or less. If the thickness of the smooth surface hard layer 13 is 10 nm or less, the average pitch A of the corrugated pattern 12a can be reliably set to 1 μm or less.

Further, since defects are hardly developed in the hard layer 12 after compression, the smooth surface hard layer 13 is preferably 1 nm or more.

Further, the thickness of the smooth surface hard layer 13 may change continuously. In a case where the thickness of the smooth surface hard layer 13 changes continuously, the pitches $A_1, A_2, A_3$, and depths $B_1, B_2, B_3, \ldots$ of the corrugated pattern 12a formed after compression will change continuously.

The method for compressing the whole laminated sheet 10a in one direction along the surface thereof may include, for example, a method of pulling and stretching one end and its opposite end of the laminated sheet 10a while fixing them with a vise, etc.

When the laminated sheet 10a is transformed in one direction, it is preferable to transform the smooth surface hard layer 13 at a deformation ratio of 5% or more and it is more preferable to transform the smooth surface hard layer 13 at a deformation ratio of 30% or more. If the smooth surface hard layer 13 is transformed at a deformation ratio of 5% or more, the average depth B of the bottom 12b of the corrugated pattern 12a can be easily set to 10% or more when the average pitch A is 100%.

Furthermore, it is more preferable to transform the smooth surface hard layer 13 at a deformation ratio of 50% or more. If the smooth surface hard layer 13 is transformed at a deformation ratio of 50% or more, the average depth B of the bottom 12b of the corrugated pattern 12a can be easily set to 100% or more when the average pitch A is 100%.

Here, the deformation ratio is (length after deformation−length before deformation)/(length before deformation)×100 (%). Otherwise, the deformation ratio is (deformed length)/(length before deformation)×100(%).

When the smooth surface hard layer is deformed two-dimensionally, it is preferable to set the deformation ratio in a direction in which the smooth surface hard layer deforms most largely to 5% or more, and it is more preferable to set the deformation ratio to 50% or more.

As the shrink film to be used as the resin layer 11 in the method (2), for example, a polyethylene-terephthalate-based shrink film, a polystyrene-based shrink film, a polyolefin-based shrink film, a polyvinyl-chloride-based shrink film, etc. can be used. Among the shrink films, a shrink film that shrinks as much as 50 to 70% is preferable. If the shrink film that shrinks as much as 50 to 70% is used, the above deformation ratio can be set to 50% or more, and the corrugated pattern forming sheet 10 in which the average pitch A of the corrugated pattern 12a is 1 μm or less, and the average depth B of the bottom 12b of the corrugated pattern 12a is 10% or more when the average pitch A is 100% can be manufactured easily. Furthermore, the corrugated pattern forming sheet 10 in which the average depth B of the bottom 12b of the corrugated pattern 12a is 100% or more when the average pitch A is 100% can also be manufactured easily. In addition, a stretch film may be used instead of a shrink film.

The heating method when the resin layer 11 is made to thermally shrink may include methods of passing a corrugated pattern forming sheet through hot air, steam, and hot water. Among these methods, the method for passing a corrugated pattern forming sheet through hot water is preferable because it can make the sheet shrink uniformly.

It is preferable that the heating temperature when the resin layer 11 is made to thermally shrink will be appropriately selected according to the kind of a shrink film to be used, a desired pitch A of the corrugated pattern 12a, and a desired depth B of the bottom 12b.

In a case where the shrink film is a shrink film that thermally shrinks uniaxially, the wavelike corrugated pattern 12a is formed along a direction orthogonal to a shrinking direction. In a case where the shrink film is a shrink film that thermally shrinks biaxially, a wavelike corrugated pattern which does not run in a specific direction is formed.

As for the smooth surface hard layer 13 in the method (2), the same metal and metallic compound as those used in the method (1) can be used, and the same thickness can be selected. Further, as the method for forming a laminated sheet 10a, similarly to the method (1), a method for vapor-depositing a metal or metallic compound on one surface of a resin layer 11, and a method for laminating a previously prepared smooth surface hard layer 13 on one surface of a resin layer 11, can be applied.

In the method (3), the method for stretching the laminated sheet 10a in one direction may include, for example, a method for pulling and stretching one end and its opposite end of the laminated sheet 10a.

In the method for (4), the ionizing radiation-curable resin may include ultraviolet-curable resin, electron beam curable resin, etc.

In the method (5), a solvent is appropriately selected according to the kind of resin constituting the resin layer 11. The drying temperature of a solvent is appropriately selected according to the kind of the solvent.

Even in the smooth surface hard layer 13 in the methods (3) to (5), the same component as that used in the method (1) can be used, and the same thickness can be selected. Further, as the method for forming a laminated sheet 10a, similarly to the method (1), a method for vapor-depositing a metal or metallic compound on one surface of a resin layer 11, and a method for laminating a previously prepared smooth surface hard layer 13 on one surface of a resin layer 11, can be applied.

In the methods of manufacturing a corrugated pattern forming sheet described above, the smooth surface hard layer 13 made of a metal or metallic compound is incomparably larger in Young's modulus than the resin layer 11. Therefore, when the smooth surface hard layer 13 harder than the resin layer 11 is compressed or shrunken, the smooth surface hard layer 13 will be folded up rather than being increased in thickness. Moreover, since the smooth surface hard layer 13 is laminated on the resin layer 11, a stress caused by compression or shrinkage is uniformly applied as a whole. Therefore, according to the invention, the corrugated pattern forming sheet 10 can be manufactured easily by meanderingly deforming the sheet. Accordingly, the corrugated pattern forming sheet 10 having excellent performance as an optical element can be simply and easily manufactured with large area.

Moreover, according to this manufacturing method, the average pitch A of the corrugated pattern 12a can be easily made short, and average depth B of the corrugated pattern 12a can be easily made large. Specifically, the average pitch A of the corrugated pattern 12a can be easily set to 1 µm or less, and the average depth B of the bottom 12b of the corrugated pattern 12a can be easily set to 10% or more when the average pitch A is 100%.

Moreover, according to this manufacturing method, the pitches $A_1$, $A_2$, $A_3$, . . . and depths $B_1$, $B_2$, $B_3$, . . . in the corrugated pattern 12a can be easily made uniform.

As conventional methods of manufacturing a corrugated pattern forming sheet, there are known a thermal nano imprinting method for pressing a corrugated pattern of a nano imprinting die against a heated and softened sheet-like thermoplastic resin, and then cooling thermoplastic resin, and an photo nano imprinting method for coating a corrugated pattern of a nano imprinting die with an uncured ionizing radiation-curable resin composition, and then irradiating the resin composition with ionizing radiation to cure it.

In the thermal nano imprinting method, it is necessary to press a die having a corrugated pattern against a thermoplastic resin with uniform pressure applied to the whole die. However, in such a method, if the area of the die becomes large, the pressure applied to the die is apt to become nonuniform. As a result, transfer of a corrugated pattern might become nonuniform. Accordingly, this thermal nano imprinting method is not suitable for production of a corrugated pattern forming sheet with large area which is used for a display of a liquid crystal television, etc.

Further, since the releasability between a die and a cured resin is inadequate in the photo nano imprinting method, transfer of a corrugated pattern might become imperfect. Moreover, this tendency becomes remarkable as the number of times of repeated use of a die increases.

In contrast, in the method for manufacturing a corrugated pattern forming sheet described above, transfer of a corrugated pattern can be omitted. Thus, the above problems in the nano imprinting method can be solved.

In addition, in the above-described embodiment, a smooth surface hard layer is provided on one whole surface of a resin layer. However, a smooth surface hard layer may be provided in a portion of one surface of a resin layer, smooth surface hard layers may be provided on both whole surfaces of a resin layer, and smooth surface hard layers may be provided in portions of both surfaces of a resin layer.

(Antireflector)

The antireflector of the invention is an antireflector including the above-described corrugated pattern forming sheet 10.

In the antireflector of the invention, one surface or both surfaces of the corrugated pattern forming sheet 10 may be provided with other layers. For example, in order to prevent staining of the surface of the corrugated pattern forming sheet 10 on the side where the corrugated pattern 12a is formed, the surface may be provided with a stain-proof layer with a thickness of about 1 to 5 nm which contains fluororesin or silicone resin as a chief ingredient.

Also, on the surface of the corrugated pattern forming sheet 10 on the side where the corrugated pattern 12a is not formed, the surface may be provided with, for example, a base material. Examples of the base material include a sheet made of resin such as triacetylcellulose.

The antireflector of the invention shows the middle refractive index between the refractive index of air, and the refractive index of the corrugated pattern forming sheet 10 (refractive index of the resin layer 11) in a portion of the wavelike corrugated pattern 12a of the corrugated pattern forming sheet 10, and the middle refractive index changes continuously. Moreover, the average pitch A of the corrugated pattern 12a is 1 µm or less, and the average depth B of the bottom 12b of the corrugated pattern 12a is 10% or more when the average pitch A is 100%. From these facts, the reflectance of light can be made particularly low, and specifically, the reflectance can be set to about 0%. This is because, as described above, the average pitch A of the corrugated pattern 12a of the corrugated pattern forming sheet 10 is as short as 1 μm or less, and the average depth B is as large as 10% or more when the average pitch A is 100%, and therefore a portion where the middle refractive index changes continuously becomes long in the thickness direction, so that the effect of suppressing reflection of light can be exhibited markedly.

Such the antireflector is attached to, for example, an image display device, such as a liquid crystal display panel or a plasma display, a tip of a light-emitting part of a light-emitting diode, the surface of a solar battery panel, etc.

In a case where the antireflector is attached to the image display device, reflection of illumination can be prevented. Therefore, the visibility of an image improves. In a case where the antireflector is attached to the tip of the light-emitting part of the light-emitting diode, the extraction efficiency of light improves. In a case where the antireflector is attached to the surface of the solar battery panel, the transmittance of light increases. Therefore, the power generation efficiency of the solar battery improves.

(Retardation Plate)

The retardation plate of the invention includes the above-described corrugated pattern forming sheet 10. However, the direction of irregularities is one direction rather than a random direction.

Even in the retardation plate of the invention, similarly to the above antireflector, one surface or both surfaces of the corrugated pattern forming sheet 10 may be provided with other layers. For example, a stain-proof layer may be provided on the surface of the corrugated pattern forming sheet 10 on the side where the corrugated pattern 12a is formed.

Also, on the surface of the corrugated pattern forming sheet 10 on the side where the corrugated pattern 12a is not formed, the surface may be provided with, for example, a base material. Examples of the base material include a sheet made of resin such as triacetylcellulose.

Moreover, the surface opposite to the surface where the corrugated pattern is formed may be further provided with a corrugated pattern.

In the retardation plate of the invention, the effect of developing a retardation can be exhibited markedly. This is because, as described above, the average pitch A of the corrugated pattern 12a of the corrugated pattern forming sheet 10 is as short as 1 μm or less, and the average depth B is as large as 10% or more when the average pitch A is 100%, and therefore a portion where air and the corrugated pattern forming sheet 10 whose refractive indexes are different from each other are alternately arranged becomes long in the thickness direction, so that a portion showing optical anisotropy becomes long. Moreover, in a case where the pitch of a corrugated pattern is approximately equal to or less than the wavelength of visible light, the same retardation can be caused over a broad visible light wavelength range.

(Original Process Sheet Plate)

The original process sheet plate includes the above-described corrugated pattern forming sheet 10, and is used as a die for allowing a corrugated pattern to be transferred to other raw materials using methods as shown below, thereby manufacturing a corrugated pattern forming sheet, which has a corrugated pattern with the same average pitch and average depth as the original process sheet plate and which can be used as an optical element, such as an antireflector or a retardation plate, on a large scale with large area.

The original process sheet plate may be provided with a support made of resin or metal for supporting the corrugated pattern forming sheet 10.

The specific method for manufacturing an optical element using the original process sheet plate may include, for example, the following methods (a) to (c).

(a) A method for coating an uncured ionizing radiation-curable resin on the surface of an original process sheet plate in which a corrugated pattern is formed, irradiating the curable resin with ionizing radiation to cure the curable resin, and then peeling off the cured coated film from the original process sheet plate. Here, although the ionizing radiation is typically ultraviolet rays or electron rays, the invention also includes visible rays, X rays, ionic rays, etc. as the ionizing radiation.

(b) A method for coating an uncured liquid thermosetting resin on the surface of an original process sheet plate in which a corrugated pattern is formed, heating and curing the liquid thermosetting resin, and then peeling off the cured coated film from the original process sheet plate.

(c) A method for bringing a sheet-like thermoplastic resin into contact with the surface of an original process sheet plate in which a corrugated pattern is formed, heating and softening thermoplastic resin while being pressed against the original process sheet plate, cooling thermoplastic resin, and then peeling off the cooled sheet-like thermoplastic sheet from the original process sheet plate.

It is possible to prepare a secondary process sheet by using the original process sheet plate and to manufacture an optical element by using the secondary process sheet. Specific methods using a secondary process sheet include the following methods (d) to (f).

(d) A method of laminating a metal plating layer (material for transferring corrugated pattern) by plating a metal, such as nickel, on the surface of an original process sheet plate in which a corrugated pattern is formed, peeling off the metal plating layer from the original process sheet plate to prepare a secondary process sheet made of metal, then coating an uncured ionizing radiation-curable resin on the surface of the secondary process sheet which has been in contact with the corrugated pattern, irradiating the curable resin with ionizing radiation to cure the curable resin, and then peeling off the cured coated film from the secondary process sheet.

(e) A method of laminating a metal plating layer (material for transferring corrugated pattern) on the surface of an original process sheet plate in which a corrugated pattern is formed, peeling off the metal plating layer from the original process sheet plate to prepare a secondary process sheet made of metal, coating an uncured liquid thermosetting resin on the surface of the secondary process sheet which has been in contact with the corrugated pattern, curing the resin by heating, and then peeling off the cured coated film from the secondary process sheet.

(f) A method of laminating a metal plating layer (material for transferring corrugated pattern) on the surface of an original process sheet plate in which a corrugated pattern is formed, peeling off the metal plating layer from the original process sheet plate to prepare a secondary process sheet made of metal, bringing a sheet-like thermoplastic resin into contact with the surface of the secondary process sheet which has been in contact with a corrugated pattern, heating and softening thermoplastic resin while being pressed against the secondary process sheet, cooling thermoplastic resin, and then peeling off the cooled sheet-like thermoplastic sheet from the secondary process sheet.

Figure 7:
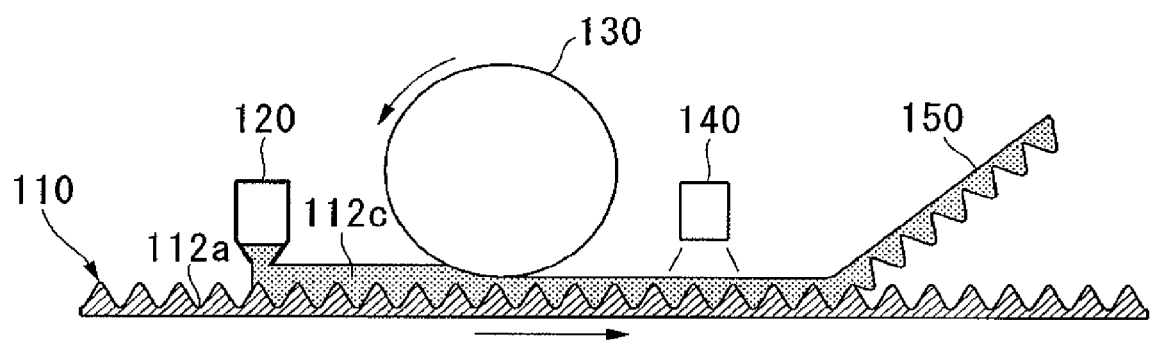
FIG. 7 is a view illustrating an example of a method for manufacturing an optical element, using the corrugated pattern forming sheet of the invention.

A specific example of the method (a) will be described. As shown in FIG. 7, first, an uncured liquid ionizing radiation-curable resin 112c is coated on the surface of a web-like original process sheet plate 110 where a corrugated pattern 112a is formed by a coater 120. Next, the original process sheet plate 110 on which the curable resin is coated is pressed by allowing a roll 130 to pass on the sheet, whereby the inside of the corrugated pattern 112a of the original process sheet plate 110 is filled with the curable resin. Thereafter, the curable resin is bridged and cured by irradiating the curable resin with ionizing radiation by an ionizing radiation irradiating apparatus 140. Then, a web-like optical element 150 can be manufactured by peeling off the cured ionizing radiation-curable resin from the original process sheet plate 110.

In the method (a), a layer made of silicone resin, fluororesin, etc. and having a thickness of about 1 to 10 nm may be provided on the surface of an original process sheet plate in which a corrugated pattern is formed, for the purpose of giving releasability before coating of an uncured ionizing radiation-curable resin.

The coater for coating an uncured ionizing radiation-curable resin on the surface of an original process sheet plate in which a corrugated pattern is formed, may include a T-die coater, a roll coater, a bar coater, etc.

The uncured ionizing radiation-curable resin may include a resin containing one or more kinds of components selected from prepolymers, such as epoxy acrylate, epoxidized oil acrylate, urethane acrylate, unsaturated polyester, polyester acrylate, polyether acrylate, vinyl/acrylate, polyene/acrylate, silicon acrylate, polybutadiene, and polystyrylmethylmethacrylate; and monomers, such as aliphatic acrylate, alicyclic acrylate, aromatic acrylate, hydroxyl-containing acrylate, allyl-containing acrylate, glycidyl-containing acrylate, carboxyl-containing acrylate, and halogen-containing acrylate. The uncured ionizing radiation-curable resin is preferably diluted with a solvent, etc.

Further, fluororesin, silicone resin, etc. may be added to the uncured ionizing radiation-curable resin.

In a case where the uncured ionizing radiation-curable resin is cured with ultraviolet rays, it is preferable to add photopolymerization initiators, such as acetophenones and benzophenones, to the uncured ionizing radiation-curable resin.

After the uncured liquid ionizing radiation-curable resin is coated, the curable resin may be irradiated with ionizing radiation after a base made of resin, glass, etc. is pasted thereto. Ionizing radiation may be emitted from either a base or an original process sheet plate having ionizing radiation transmittability.

The thickness of the sheet of ionizing radiation-curable resin after curing is preferably set to about 0.1 to 100 μm. If the thickness of the sheet of ionizing radiation-curable resin after curing is 0.1 μm or more, sufficient strength can be secured, and if the thickness is 100 μm or less, sufficient flexibility can be secured.

In the above method shown in FIG. 7, the original process sheet plate is a web-like sheet, but it may be a leaf-like sheet. In a case where the leaf-like sheet is used, a stamping method for using the leaf-like sheet as a flat plate-like die, a roll-in printing method for winding the leaf-like sheet around a roll to use it as a cylindrical die, etc. can be applied. Further, a leaf-like original process sheet plate may be arranged inside a die of an injection molding machine.

However, in the method for using these leaf-like sheets, it is necessary to repeat a process of forming a corrugated pattern multiple times in order to produce optical elements on a large scale. In a case where the releasability between an ionizing radiation-curable resin and an original process sheet plate is low, clogging occurs in a corrugated pattern when the process is repeated multiple times, and transfer of the corrugated pattern tends to become imperfect.

On the other hand, in the method shown in FIG. 7, a corrugated pattern can be continuously formed with large area because the original process sheet plate is a web-like sheet. Therefore, even if the number of times of repeated use of a corrugated pattern forming sheet is few, a required quantity of optical elements can be manufactured in a short time.

In the method (e) and (b), the liquid thermosetting resin may include, for example, uncured melamine resin, urethane resin, epoxy resin, etc.

Further, the curing temperature in the method (b) is preferably lower than the glass transition temperature of an original process sheet plate. This is because there is a possibility that a corrugated pattern of the original process sheet plate may deform during curing if the curing temperature is higher than the glass transition temperature of the original process sheet plate.

In the method (c) and (f), thermoplastic resin may include, for example, acrylic resin, polyolefin, polyester, etc.

A pressure when pressing the sheet-like thermoplastic resin against the secondary process sheet is preferably from 1 to 100 MPa. When the pressure is 1 MPa or more, it is possible to transfer a corrugated pattern with high accuracy, and when the pressure is 100 MPa or less, it possible to prevent excess pressure from being applied.

Further, the heating temperature of thermoplastic resin in the method (c) is preferably lower than the glass transition temperature of an original process sheet plate. This is because there is a possibility that a corrugated pattern of the original process sheet plate may deform during heating if the heating temperature is higher than the glass transition temperature of the original process sheet plate.

A cooling temperature after heating is preferably less than the glass transition temperature of the thermoplastic resin so as to be able to transfer a corrugated pattern with high accuracy.

Among the methods (a) to (c), the method (a) of using an ionizing radiation-curable resin in that heating can be omitted and deformation of a corrugated pattern of an original process sheet plate can be prevented is preferable.

In the methods (d) to (f), the thickness of a secondary process sheet made of metal is preferably set to about 50 to 500 μm. If the thickness of the secondary process sheet made of metal is 50 μm or more, the secondary process sheet has sufficient strength, and if the thickness is 500 μm or less, sufficient flexibility can be secured.

In the methods (d) to (f), a metal sheet with small thermal deformation is used as a process sheet. Therefore, any of an ionizing radiation-curable resin, a thermosetting resin, and a thermoplastic resin can be used as a material for corrugated pattern forming sheets.

In the methods (d) to (f), the secondary process sheet is obtained by transferring the corrugated pattern of the original process sheet plate to a metal; however the secondary process sheet may be obtained by transferring to resin. In this case, the resin which can be used includes, for example, polycarbonate, polyacetal, polysulfone, and ionizing radiation-curable resin used in the method (a). When using an ionizing radiation-curable resin, the ionizing radiation-curable resin is performed in order of coating, curing, and peeling, similar to the method (a).

An adhesive layer may be provided in the surface of an optical element obtained as described above, which is opposite to the surface in which a corrugated pattern is formed. Moreover, a further corrugated pattern may be formed in the surface opposite to the surface where the corrugated pattern is formed.

Further, the corrugated pattern forming sheet or secondary process sheet used as an original process sheet plate may be used as a protective layer without peeling off, and the protective layer may be peeled off immediately before use of an optical element.

EXAMPLES

The present invention will now be described in more detail by way of examples, but the present invention is not limited to the following examples. In the following examples, parts and percentages are by weight unless otherwise specified.

The Young's moduli in the following examples are values which are measured by using a tensile testing machine (Tensiron RTC-1210 made by Orientec Corp.), setting temperature to 23° C., according to the "Method for testing the Young's modulus of a metallic material at an elevated temperature" of JIS Z 2280-1993. This is the same even in a case where the hard layer is made of a metallic compound.

Manufacture Example 1

A laminated sheet was obtained by vacuum-depositing titanium having a Young's modulus of 115 GPa on one surface of a polyethylene terephthalate shrink film (Hishipet LX-10S made by Mitsubishi Plastics, Inc.) that thermally shrinks uniaxially, has a thickness of 50 μm, and has a Young's modulus of 3 GPa so as to have a thickness of 3 nm, thereby forming a smooth surface hard layer.

Next, a corrugated pattern forming sheet whose hard layer has a wavelike corrugated pattern which has a period in a direction orthogonal to a shrinking direction was obtained by heating the laminated sheet for 1 minute at 100° C., and making the sheet thermally shrink to 40% of a length before heating (that is, making the sheet deformed at a deformation ratio of 60%).

Manufacture Example 2

A corrugated pattern forming sheet was obtained similarly to Manufacture Example 1 except for vacuum-depositing titanium so as to have a thickness of 7 nm.

Manufacture Example 3

A corrugated pattern forming sheet was obtained similarly to Manufacture Example 1 except for heating the laminated sheet for 1 minute at 75° C., and making the sheet thermally shrink to 70% of a length before heating (that is, making the sheet deformed at a deformation ratio of 30%).

Manufacture Example 4

A corrugated pattern forming sheet was obtained similarly to Manufacture Example 1 except that a polyethylene terephthalate shrink film (Hishipet PX-40S made by Mitsubishi Plastics, Inc.) that thermally shrinks biaxially, has a thickness of 50 μm, and has a Young's modulus of 3 GPa was used instead of Hishipet LX-10S. In the corrugated pattern forming sheet of Manufacture Example 4, the hard layer has a wavelike corrugated pattern which does not run in a specific direction.

Manufacture Example 5

A corrugated pattern forming sheet was obtained similarly to Manufacture Example 1 except that platinum having a Young's modulus of 168 GPa was vacuum-deposited so as to have a thickness of 3 nm instead of vacuum deposition of titanium.

Manufacture Example 6

A corrugated pattern forming sheet was obtained similarly to Manufacture Example 1 except that silicon dioxide having a Young's modulus of 72 GPa was vacuum-deposited so as to have a thickness of 3 nm instead of vacuum deposition of titanium.

Manufacture Example 7

A corrugated pattern forming sheet was obtained similarly to Manufacture Example 1 except that titanium dioxide having a Young's modulus of 300 GPa was vacuum-deposited so as to have a thickness of 1 nm instead of vacuum deposition of titanium. This corrugated pattern forming sheet has a self-cleaning function which decomposes an organic matter adhering to a surface when it is irradiated with light.

Manufacture Example 8

A corrugated pattern forming sheet was obtained similarly to Manufacture Example 1 except that gallium arsenide having a Young's modulus of 83 GPa was chemically deposited so as to have a thickness of 3 nm instead of vacuum deposition of titanium.

Manufacture Example 9

A sheet made of polydimethyl siloxane having a Young's modulus of 2 MPa and having a thickness of 5 mm was pulled until it became twice as long as itself by a pulling device, and was fixed in that state. Then, in that state, a laminated sheet was obtained by vacuum-depositing titanium having a Young's modulus of 115 GPa on one surface of the sheet so as to have a thickness of 3 nm, thereby forming a smooth surface hard layer.

Next, a corrugated pattern forming sheet whose hard layer has a wavelike corrugated pattern which has a period in a direction orthogonal to a compression direction was obtained by stopping the pulling, and then returning the laminated sheet to its length before the pulling, thereby compressing the hard layer at a deformation ratio of 50%.

Manufacture Example 10

A laminated sheet in which a resin layer and a smooth surface hard layer were laminated was obtained by vacuum-depositing titanium having a Young's modulus of 115 GPa on one surface of a sheet made of polydimethyl siloxane having a Young's modulus of 2 MPa and having a thickness of 5 mm so as to have a thickness of 3 nm.

Next, a corrugated pattern forming sheet whose hard layer has a wavelike corrugated pattern which has a period in a pulling direction was obtained by pulling the laminated sheet to five times as long as itself by a pulling device, thereby making the sheet shrink to 50% in a direction orthogonal to the pulling direction (that is, making the sheet deformed at a deformation ratio of 50%).

Manufacture Example 11

A corrugated pattern forming sheet was obtained similarly to Manufacture Example 1 except that titanium was vacuum-deposited so as to have a thickness of 15 nm.

Manufacture Example 12

An attempt was made to obtain a corrugated pattern forming sheet similarly to Manufacture Example 1 except that a polyethylene terephthalate film (G2 made by Teijin Ltd.) that stretches biaxially, has a thickness of 50 μm, and has a Young's modulus of 5 GPa was used instead of the shrink film. However, the corrugated pattern forming sheet was not obtained.

Manufacture Example 13

A laminated sheet was obtained by vacuum-depositing titanium having a Young's modulus of 115 GPa on one surface of a polyethylene terephthalate shrink film (Hishipet LX-10S made by Mitsubishi Plastics, Inc.) that thermally shrinks uniaxially, has a thickness of 50 μm, and has a Young's modulus of 3 GPa so as to have a thickness of 3 nm, thereby forming a smooth surface hard layer.

Next, a corrugated pattern forming sheet was obtained similarly to Manufacture Example 1 except that the laminated sheet was heated for 1 minute at 70 C, and making the sheet thermally shrink to 97% of a length before heating (that is, making the sheet deformed at a deformation ratio of 3%).

Manufacture Example 14

An optical element was obtained as follows, using the corrugated pattern forming sheet obtained by Manufacture Example 1 as an original process sheet plate.

That is, an uncured ultraviolet-curable resin composition containing an epoxy acrylate-based prepolymer, 2-ethylhexyl acrylate, and a benzophenone-based photopolymerization initiator was coated on the surface of the original process sheet plate obtained by Manufacture Example 1, in which a corrugated pattern was formed.

Next, a triacetyl cellulose film having a thickness of 50 μm was superposed on and pressed against the surface of the coated film of the uncured ultraviolet-curable resin composition which is not in contact with the original process sheet plate.

Next, an optical element was obtained by irradiating the triacetyl cellulose film with ultraviolet rays to cure the uncured ultraviolet-curable resin, and peeling off the laminated product of the cured substance and triacetylcellulose from the original process sheet plate.

Manufacture Example 15

An optical element was obtained as follows, using the corrugated pattern forming sheet obtained by Manufacture Example 1 as an original process sheet plate.

That is, a nickel-plated sheet having a thickness of 200 μm was obtained by performing nickel plating on the surface of the original process sheet plate obtained by Manufacture Example 1, in which a corrugated pattern was formed, and peeling off the nickel plating. Then, an uncured ultraviolet-curable resin composition containing an epoxy acrylate-based prepolymer, 2-ethylhexyl acrylate, and a benzophenone-based photopolymerization initiator was coated on the surface of the nickel-plated sheet which was contacted with the original process sheet plate.

Next, a triacetyl cellulose film having a thickness of 50 μm was superposed on and pressed against the surface of the coated film of the uncured ultraviolet-curable resin composition which is not in contact with the nickel-plated sheet.

Next, an optical element was obtained by irradiating the triacetyl cellulose film with ultraviolet rays to cure the uncured curable resin, and peeling off the laminated product of the cured substance and triacetylcellulose from the nickel-plated sheet.

Manufacture Example 16

An optical element was obtained similarly to Manufacture Example 14 except that a thermosetting epoxy resin was used instead of the ultraviolet-curable resin composition, and thermosetting epoxy resin was cured by heating instead of radiating ultraviolet rays.

Manufacture Example 17

A nickel-plated sheet having a thickness of 200 μm was obtained similarly to Manufacture Example 14. Then, a polyacrylamide film having a thickness of 50 μm was superposed on the surface of the nickel-plated sheet which has contacted with the original process sheet plate, and the film was then heated. An optical element was obtained by pressing the polyacrylamide film softened by heating and the nickel-plated sheet from both sides thereof, cooling and curing them, and then peeling off the cured polyacrylamide film from the nickel-plated sheet.

The top surfaces of the corrugated pattern forming sheets of Manufacture Examples 1 to 11, and 13 and the top surfaces of the optical elements of Manufacture Examples 14 to 17 were captured by an atomic force microscope (Nanoscope III made by Veeco Instruments).

In the corrugated pattern forming sheets of Manufacture Examples 1 to 3, 5 to 11, and 13 and the optical elements of Manufacture Examples 14 to 17, the pitches of each corrugated pattern were measured at ten places in an image captured by the atomic force microscope, and the measured pitches were averaged, thereby obtaining an average pitch.

The average pitch of the corrugated pattern forming sheet of Manufacture Example 4 was obtained by the method for Fourier-transforming an image of a corrugated pattern, which is described in above.

As for averages depths of the corrugated pattern forming sheets of Manufacture Examples 1 to 11, and 13 and the optical elements of Manufacture Examples 14 to 17, the depths of individual bottoms of each corrugated pattern were measured at ten places in a cross-sectional image obtained by the atomic force microscope, and the measured depths were averaged, thereby obtaining an average depth.

These values are shown in Table 1.

Further, suitability as optical elements was evaluated according to the following standards from the average pitches of the corrugated patterns and the average depths of the bottoms. The evaluation results are shown in Table 1.

O: The average pitch of a corrugated pattern is 1 μm or less, and the average depth is 10% or more given an average pitch of 100%; consequently, the sheet is suitable as an optical element.

X: The average pitch of a corrugated pattern is over 1 μm, and the average depth is less than 10% given an average pitch of 100%; thus the sheet is not suitable as an optical element.

TABLE 1

|  | Pitch of Corrugated Pattern (nm) | Depth of Deepest Portion of Corrugated Pattern (nm) | Depth/ Pitch (%) | Evaluation |
| --- | --- | --- | --- | --- |
| Manufacture Example 1 | 300 | 300 | 100 | ○ |
| Manufacture Example 2 | 700 | 700 | 100 | ○ |
| Manufacture Example 3 | 300 | 90 | 30 | ○ |
| Manufacture Example 4 | 300 | 250 | 83 | ○ |
| Manufacture Example 5 | 250 | 250 | 100 | ○ |
| Manufacture Example 6 | 200 | 200 | 100 | ○ |
| Manufacture Example 7 | 250 | 250 | 100 | ○ |
| Manufacture Example 8 | 220 | 220 | 100 | ○ |
| Manufacture Example 9 | 300 | 200 | 67 | ○ |
| Manufacture Example 10 | 300 | 200 | 67 | ○ |
| Manufacture Example 11 | 1100 | 700 | 64 | X |
| Manufacture Example 12 | A corrugated pattern is not formed | | | X |
| Manufacture Example 13 | 300 | 28 | 9 | X |
| Manufacture Example 14 | 300 | 300 | 100 | ○ |
| Manufacture Example 15 | 300 | 300 | 100 | ○ |
| Manufacture Example 16 | 300 | 300 | 100 | ○ |
| Manufacture Example 17 | 300 | 300 | 100 | ○ |

In the manufacturing methods of Manufacture Examples 1 to 11, and 13 in which a laminated sheet in which a smooth surface hard layer made of a metal or a metallic compound was provided on one surface of a resin layer was shrunken or compressed, corrugated pattern forming sheets could be manufactured easily. Particularly in the corrugated pattern forming sheets obtained in Manufacture Examples 1 to 10, the average pitch of each corrugated pattern is 1 μm or less, and the average depth of the bottom is 10% or more given an average pitch of 100%. Consequently, the sheets were suitable as optical elements. The reason the average pitches and average depths as described above were obtained in Manufacture Examples 1 to 10 is that the thickness of the smooth surface hard layer was 10 nm or less, the Young's modulus was low, the deformation ratio was set to 30% or more.

In addition, in Manufacture Example 11, the thickness of the smooth surface hard layer was over 10 nm. Therefore, as for the obtained corrugated pattern forming sheet, the average pitch of the corrugated pattern was over 1 μm. In addition, in Manufacture Example 13, the deformation ratio was set to 3%. Therefore, as for the obtained corrugated pattern forming sheet, the average depth of the bottom of a corrugated pattern was less than 10% given an average pitch of 100%. These are not necessarily suitable as optical elements.

Further, according to the manufacturing methods of Manufacture Examples 14 to 17 using the corrugated pattern forming sheet obtained in Manufacture Example 1 as an original process sheet plate, optical elements having a corrugated pattern of the same average pitch and average depth as the corrugated pattern forming sheet could be manufactured simply and easily.

On the other hand, in Manufacture Example 12 using a biaxially stretched polyethylene terephthalate film as a resin layer, a smooth surface hard layer was not meanderingly deformed. Therefore, a corrugated pattern was not formed.

The corrugated pattern forming sheet of the invention can be utilized for, for example, a polarizing plate, an abrasive film, a cell culture sheet, an electrolyte membrane for fuel cells, a die-releasing film, an anti-blocking film, an easy adhesion film, a film with improved printing performance, etc. Further, the corrugated pattern forming sheet of the invention can also be utilized for plural ones among the above applications.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims

What is claimed is:

1. A corrugated pattern forming sheet comprising a resin layer, and a hard layer provided at least in a portion of an outer surface of the resin layer, the hard layer having a wavelike corrugated pattern,
    wherein the hard layer provided in one whole surface of the resin layer,
    wherein the thickness of the hard layer is 5 nm or less,
    wherein the hard layer is made of at least one metal or at least one metallic compound, and wherein
    the average pitch of the corrugated pattern is 0.4 μm or less, and the average depth of the bottom of the corrugated pattern is 100% or more given an average pitch of 100%.

2. The corrugated pattern forming sheet according to claim 1, wherein the hard layer is made of a metallic compound.

3. The corrugated pattern forming sheet according to claim 2, wherein the metallic compound is selected from the group consisting of titanium oxide, aluminum oxide, zinc oxide, magnesium oxide, tin oxide, copper oxide, indium oxide, cadmium oxide, lead oxide, silicon oxide, barium fluoride, calcium fluoride, magnesium fluoride, zinc sulfide, and gallium arsenide.

4. The corrugated pattern forming sheet according to claim 1, wherein the hard layer is made of a metal.

5. The corrugated pattern forming sheet according to claim 4,
    wherein the metal is at least one kind of metal selected from the group consisting of gold, aluminum, silver, carbon, copper, germanium, indium, magnesium, niobium, palladium, lead, platinum, silicon, tin, titanium, vanadium, zinc, and bismuth.

6. An antireflector comprising the corrugated pattern forming sheet of any one of claims 1 to 5.

7. A retardation plate comprising the corrugated pattern forming sheet of any one of claims 1 to 5.

8. An original process sheet plate, comprising the corrugated pattern forming sheet of any one of claims 1 to 5.

9. A method for manufacturing an optical element comprising:
    coating an uncured curable resin onto a surface of the original process sheet plate of claim 8, and
    peeling a cured coating film from the original process sheet plate after curing the curable resin.

10. A method for manufacturing an optical element comprising:
    contacting a sheet-like thermoplastic resin with a surface of the original process sheet plate of claim 8;
    cooling the thermoplastic resin after softening by heating while pressing to the original process sheet plate; and
    peeling the cooled sheet-like thermoplastic resin from the original process sheet plate.

11. A method for manufacturing an optical element comprising:
    laminating a material for transferring a corrugated pattern onto a surface of the original process sheet plate of claim 8;
    preparing a secondary process sheet by peeling the material for transferring the corrugated pattern laminated on the corrugated pattern from the original process sheet plate;

coating an uncured curable resin onto a surface of the secondary process sheet contacting the corrugated pattern of the original process sheet plate; and peeling a cured coating film from the secondary process sheet after curing the curable resin.

12. A method for manufacturing an optical element comprising:

laminating a material for transferring a corrugated pattern onto a surface of the original process sheet plate of claim 8;

preparing a secondary process sheet is prepared by peeling the material for transferring the corrugated pattern laminated on the corrugated pattern from the original process sheet plate;

contacting a sheet-like thermoplastic resin with a surface of the secondary process sheet contacting the corrugated pattern of the original process sheet plate;

cooling the thermoplastic resin after softening by heating while pressing to the secondary process sheet; and peeling the cooled sheet-like thermoplastic resin from the secondary process sheet.

13. A method for manufacturing a sheet having a corrugated pattern, comprising using a sheet according to any one of claims 1 to 5 as a die to create a sheet with the same average pitch and average depth as the corrugated pattern forming sheet.

* * * * *